(12) United States Patent
Shapiro et al.

(10) Patent No.: US 9,699,311 B2
(45) Date of Patent: Jul. 4, 2017

(54) SYSTEMS, METHOD, AND COMPUTER PROGRAM PRODUCT FOR CROSS-CHANNEL CUSTOMER RELATIONSHIP MANAGEMENT SUPPORT WITH DYNAMICALLY INSERTED VOICE CALL NUMBERS

(71) Applicant: IFBYPHONE, INC., Chicago, IL (US)

(72) Inventors: Irvin M. Shapiro, Skokie, IL (US); Timothy Edman Dupree, Naperville, IL (US); Khyle David Keys, Lindenhurst, IL (US)

(73) Assignee: DIALOGTECH INC., Chicago, IL (US)

( * ) Notice: Subject to any disclaimer, the term of this patent is extended or adjusted under 35 U.S.C. 154(b) by 6 days.

(21) Appl. No.: 14/228,789

(22) Filed: Mar. 28, 2014

(65) Prior Publication Data

US 2015/0281450 A1    Oct. 1, 2015

(51) Int. Cl.
 *H04M 3/42* (2006.01)
 *H04M 15/00* (2006.01)
 *H04M 3/51* (2006.01)
 *H04M 3/487* (2006.01)
 *H04L 12/66* (2006.01)
 *H04M 7/00* (2006.01)

(52) U.S. Cl.
CPC ....... *H04M 3/5191* (2013.01); *H04M 3/4878* (2013.01); *H04M 3/5166* (2013.01); *H04M 7/0033* (2013.01)

(58) Field of Classification Search
CPC ............... G06Q 30/02; G06Q 30/0253; G06Q 30/0273; G06Q 30/0277; G06Q 30/0242; G06Q 30/0201; G06Q 30/0241; G06Q 30/0246; G06Q 30/0251; G06Q 30/0255; G06Q 30/00; G06Q 20/12; H04M 1/2473; H04M 3/42042; H04M 3/42161; H04M 3/42195; H04M 3/42059; H04M 3/5191; H04M 3/5235; H04M 7/0012; H04M 7/003
USPC ......... 705/14.73, 14.69, 14.45, 14.51, 14.41, 705/14.53, 14.23, 14.39, 14.4, 14.49, 705/14.54; 379/201.12, 265.09
See application file for complete search history.

(56) References Cited

U.S. PATENT DOCUMENTS

| 7,289,504 | B1 * | 10/2007 | Hippelainen et al. ........ 370/392 |
| 8,280,022 | B1 * | 10/2012 | Trinidad ............ H04M 3/5158 379/142.06 |
| 2003/0147519 | A1 * | 8/2003 | Jain et al. ................ 379/211.02 |
| 2007/0124290 | A1 * | 5/2007 | Swanson ........... G06F 17/30864 |
| 2008/0243634 | A1 * | 10/2008 | Dworkin et al. ............... 705/26 |
| 2008/0304631 | A1 * | 12/2008 | Vilis et al. ...................... 379/45 |
| 2009/0249480 | A1 * | 10/2009 | Osipkov et al. ................ 726/22 |
| 2010/0023581 | A1 * | 1/2010 | Lahav .......................... 709/203 |

(Continued)

*Primary Examiner* — Ahmad F Matar
*Assistant Examiner* — Kharye Pope
(74) *Attorney, Agent, or Firm* — Barnes & Thornburg LLP (57) ABSTRACT

Disclosed embodiments relate generally to Customer Relationship Management (CRM), and more particularly to a system, methods, and computer program products providing or supporting a cross-channel CRM support system for serving contact phone numbers for display at a web site and using such numbers to track, analyze and utilize prospective customer behavior on the Internet prior to the prospective customer calling the served contact phone number.

35 Claims, 3 Drawing Sheets

(56) References Cited

U.S. PATENT DOCUMENTS

| | | | |
|---|---|---|---|
| 2011/0282730 A1* | 11/2011 | Tarmas | 705/14.42 |
| 2011/0282739 A1* | 11/2011 | Mashinsky et al. | 705/14.53 |
| 2011/0307331 A1* | 12/2011 | Richard et al. | 705/14.45 |
| 2011/0307341 A1* | 12/2011 | Zohar et al. | 705/14.73 |
| 2012/0177189 A1* | 7/2012 | Chatterjee et al. | 379/93.17 |
| 2012/0300916 A1* | 11/2012 | Woicke | 379/201.12 |
| 2013/0036202 A1* | 2/2013 | Lahav | 709/219 |
| 2014/0278953 A1* | 9/2014 | Ismail et al. | 705/14.49 |
| 2015/0066633 A1* | 3/2015 | Agrawal et al. | 705/14.45 |

* cited by examiner

SYSTEMS, METHOD, AND COMPUTER PROGRAM PRODUCT FOR CROSS-CHANNEL CUSTOMER RELATIONSHIP MANAGEMENT SUPPORT WITH DYNAMICALLY INSERTED VOICE CALL NUMBERS

COPYRIGHT NOTICE

Portions of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Disclosed embodiments relate generally to Customer Relationship Management (CRM), and more particularly to a system, methods, and computer program products providing or supporting a cross-channel CRM support system for serving contact phone numbers for display at a web site and using such numbers to track, analyze and utilize prospective customer behavior on the Internet prior to the prospective customer calling the served contact phone number.

BACKGROUND

In the field of on-line CRM, companies with web-presences (or marketing agencies working on their behalf) bid on key words with search engines to direct visitors to their web sites and generate revenue. The various paths to a particular web site via other web sites on the Internet and search engines may be thought of as the web site's referral. Note there may be, conceptually, many referrals for a client web site or web page. Likewise, the term "funnel" has come to conventionally mean a set route of web pages that users must go through to get to a particular page on a web site.

Conventionally, various technologies exist for tracking referral data and funnel data; however, these technologies generally rely on sessions or cookies set up with the prospective customer's computer, usually triggered by a user placing items for purchase in a shopping cart at the web site.

Likewise, there are various, conventional CRM systems, methods, and computer program products for "call tracking" (i.e., the counting and gathering of marketing data on incoming voice phone calls that have been generated by a website). Exemplary of such call tracking systems is Source-Trak™, which is available from Ifbyphone, Inc., Chicago, Ill. and is described in U.S. Ser. No. 13/601,447, filed Aug. 31, 2012, assigned to the assignee of the present invention, and incorporated herein by reference.

Such systems, methods, and computer program products have typically been designed for the purposes of Search Engine Optimization (SEO), assessing a client's return on investment in a Pay-Per-Click (PPC) advertising environment, lead generation, direct marketing, etc.

Other forms of voice call tracking are known in the prior art. For example, the AccuTrack™ line of products and services which are available from Mongoose Metrics LLC of Independence, Ohio USA, and CallTrack® which is available from CallSource, Inc. of Westlake Village, Calif. USA.

Other forms of call tracking use Application Programming Interfaces ("API"). For example, LogMyCalls™, which is available from ContactPoint LLC of St. George, Utah USA, provides a flexible API for users to programmatically manage their account. The MCA platform that is available from Marchex Inc. of Seattle, Wash. USA includes a real-time XML-RPC based API (which Marchex refers to as its "Application Platform Interface") that allows clients to integrate the features and functionality of the MCA platform into their own internal reporting systems, giving great control to how data is presented.

Notwithstanding such advances, voice call tracking systems according to the prior art have been unable to both adequately track prospective customer referral or funnel activity via the Internet and confidently match up that activity with a subsequent voice call.

SUMMARY

Accordingly, various disclosed embodiments provide a system, methods, and computer program products for tracking prospective customers' referral or funnel activity as it matures into a voice call to a contact phone number requesting services.

In accordance with at least one embodiment, the system, methods and computer program products enable identification and analysis of prospective customers' web-based behavior with a subsequent call to a contact phone number listed on a visited client's web site.

Additionally, in accordance with at least one disclosed embodiment, the tracked data may be aggregated with data provided by the client web site and/or a third party's analytics software so that the client can not only make informed call routing decisions, but also determine the value of certain bid upon key words over a period of time as well as the lifetime value of keywords based on account revenue. This data aggregation is based at least in part on the ability to map data associated with a voice call to a contact phone number into a format that may be aggregated with data conventionally obtained by such analytics software.

DETAILED DESCRIPTION OF THE EMBODIMENTS

In accordance with at least one embodiment, the system, methods and computer program products enable identification and analysis of prospective customer behavior on the Internet with a prospective customer subsequently calling a phone number listed on a visited web site. This is a particular problem for companies that offer services in the real world rather than via the Internet. For example, a plumber's web site may likely not enable the ability to put products in a shopping cart; rather, the visitor simply looks up the contact phone number for the plumber displayed on the web site and sets up an appointment with the plumber over a voice call to a displayed contact phone number.

In such situations, it is not readily apparent to the plumber how the prospective customer on the phone obtained the plumber's contact phone number. Although the plumber could ask the caller, the amount of information the plumber is able to effectively and reliably obtain from the caller is limited, variable and potentially inaccurate. Moreover, the plumber does not have access to that information prior to receiving the voice call to set up the appointment. As a result, the plumber does not have information prior to taking the voice call that would enable the plumber to prepare for the call, intelligently route the voice call to personnel at the plumber that may be specialized in discussing a particular service searched for by the prospective customer or ensure that the plumber's personnel has access to a particular sales script associated with the searched for service.

To the contrary, disclosed embodiments insert a contact phone number on a client's web site that is specific to the visitor (and/or a specific advertisement campaign or other criteria discussed herein) and, optionally, a specific to a period of time. That contact phone number is selected from a specific pool of phone numbers that are mapped to web-based activity and may be selected and inserted at the client's web site only for a specified period of time.

It should be understood that the disclosed embodiments may be effectively utilized by businesses having web presences (e.g., a web site) but which also receive voice calls at their contact phone numbers requesting the business's products or services. However, it should also be understood that disclosed embodiments may be utilized by CRM support businesses that provide support to these product/service businesses. Therefore, for clarity, the disclosed embodiments are explained herein, in the context of a client, e.g., the plumber having a web site, a prospective customer, e.g., a user that visits the web site of the plumber via the Internet, and the inventive cross-channel CRM support system that enables mapping of web-based activity to a dynamically served voice call phone number, to enable the features of the disclosed embodiments described herein.

It should be understood that the inventive cross-channel CRM support system may be implemented by the client or by a third party providing some or all of the features of the CRM system to the client. With this understanding in mind, in accordance with the disclosed embodiments, as a result of serving such an individualized phone number, the client's web site (and/or CRM support software running on the web site or used by the client's web site) has knowledge of the path on the Internet that the prospective customer traveled to get to the client's web site (referred to hereafter as the "referral") and the navigation on the web site that lead to the displayed phone number (referred to hereafter as the "funnel" or "clickstream").

That information may then be used to select a contact telephone number displayed to the prospective customer and subsequently used by the prospective customer to call the client company associated with the web site, e.g., the plumber. This serving of individualized numbers may be termed "dynamic number insertion" or DNI technology.

This may be used by the cross-channel CRM support system to map data indicating keywords, the referral, and/or a client's web site funnel that lead the prospective customer to call the displayed phone number.

Thus, in the context of the disclosed embodiments, DNI enables display of a unique contact phone number on a client's web site based on a number of different parameters including, for example, the referral data for the prospective customer's visit, e.g., a particular search engine, a web advertisement, a link on a partner's web page, etc., and/or funnel data at the client web site Additionally, the displayed phone number may change depending on what page within the client's web site the prospective customer is viewing, e.g., a different call number is displayed on a page related to sump pump maintenance than is listed on a page related to repairing and maintaining pipes so as to be clear of root damage; in both locations of the web site where DNI is used to insert a specialized contact phone number, the DNI also enables the ability to track the referral, funnel data associated with the prospective customer's web-based activity and map it to the displayed contact phone number that may be called by the prospective customer.

Likewise, the cross-channel CRM support system can initiate display of one phone call number on the client's website when a prospective customer arrives at a landing page on the web site and a different call number when the prospective customer clicks on a Pay Per Click (PPC) advertisement.

This web-based activity can be mapped to any contact phone number(s) the client chooses, allowing the client (or a CRM organization acting on its behalf) to track which advertisements and referral sources generate the most phone calls, which is an important part of Return On Investment (ROI) that has historically been very difficult to assess.

Figure 1:
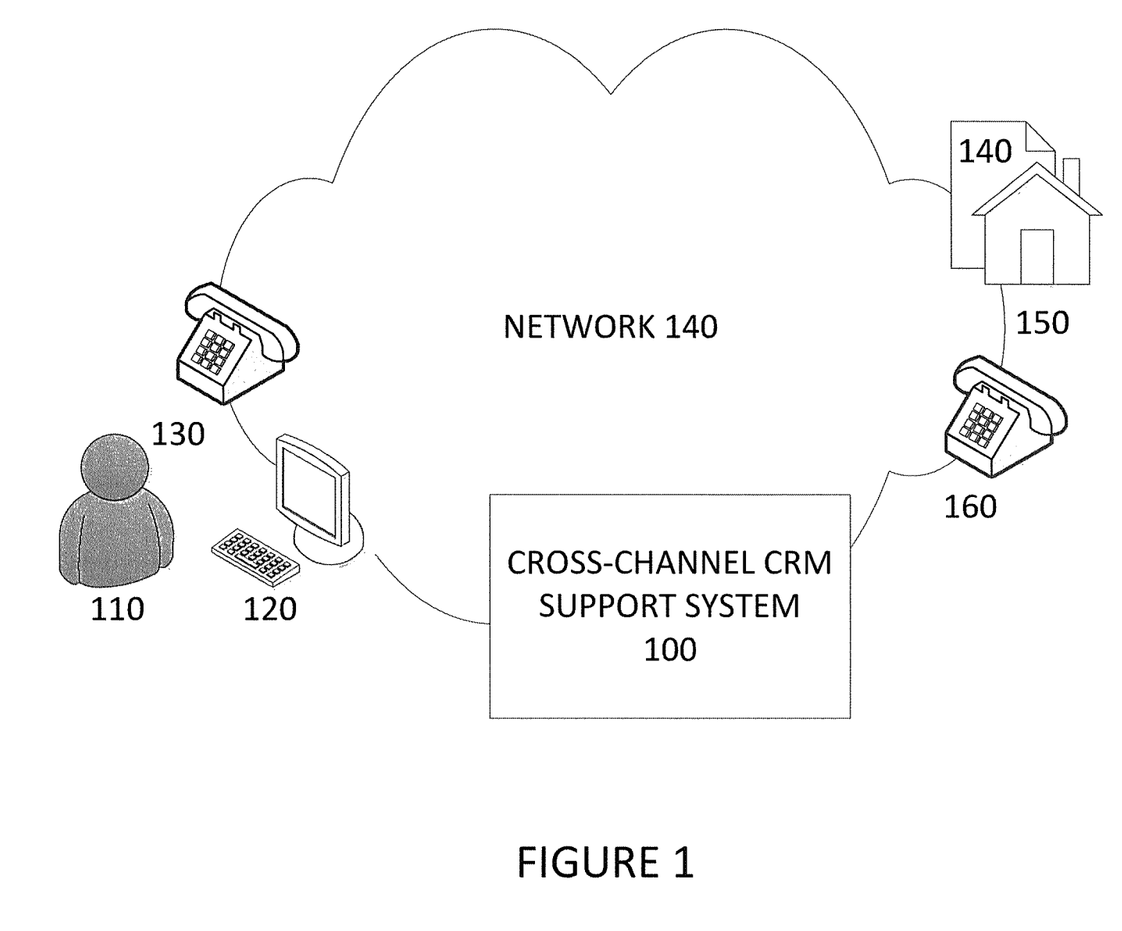
FIG. 1 illustrates a simplified block diagram of a cross-channel CRM support system in conjunction with other components according to one disclosed embodiment.

Referring now to the drawings, wherein like reference numerals and characters represent like or corresponding parts and steps throughout each of the many views, there is shown in FIG. 1, a simplified block diagram of a cross-channel CRM support system 100 for tracking a prospective customer's web-based activity and mapping that activity to a contact phone number displayed on a client's web site and potentially used by the prospective customer to contact the client to obtain the client's services.

As shown in FIG. 1, the cross-channel CRM support system 100 is configured to support interactions between of a prospective customer 110 with a client's web site 200 over a communication network 140. It should be understood that the communication network 140 may include more than one network and more than one type of network. Thus, by use of the term "network", it should be understood that the foregoing is not intended to limit the present invention to any particular wireline or wireless network, such as Local Area Networks (LANs), Metropolitan Area Networks (MANs), Wide Area Networks (WANs), a Public Switched Telephone Network (PSTN), or combinations thereof. Thus, the network 140 may simply comprise the Internet (also known as the "Web" or "World Wide Web"), but it may similarly comprise intranets, extranets, virtual private networks (VPNs), and the like.

Thus, it should be understood that the communication network 140 may be thought of as having more than one communication channel. Thus, the prospective customer 110 may communicate with the client in at least two channels: at the client's web site 200 via the Internet and via a voice call over one or more telephone networks to a contact phone system 160 for the client 150, both networks being encompassed in the communication network 140. Accordingly, the prospective customer 110 may communicate with the client 150 via a computer 120 at the client's web site 200 or via a phone 130 by calling the phone number(s) listed on the client's web site 200 to contact the client.

The cross-channel CRM support system 100 can be requested to interject itself into communication between the prospective customer 110 and the client's web site 200 by dynamically serving an individualized contact phone number for insertion into a web page included in the web site 200, as viewed by the prospective customer 110.

Figure 2:
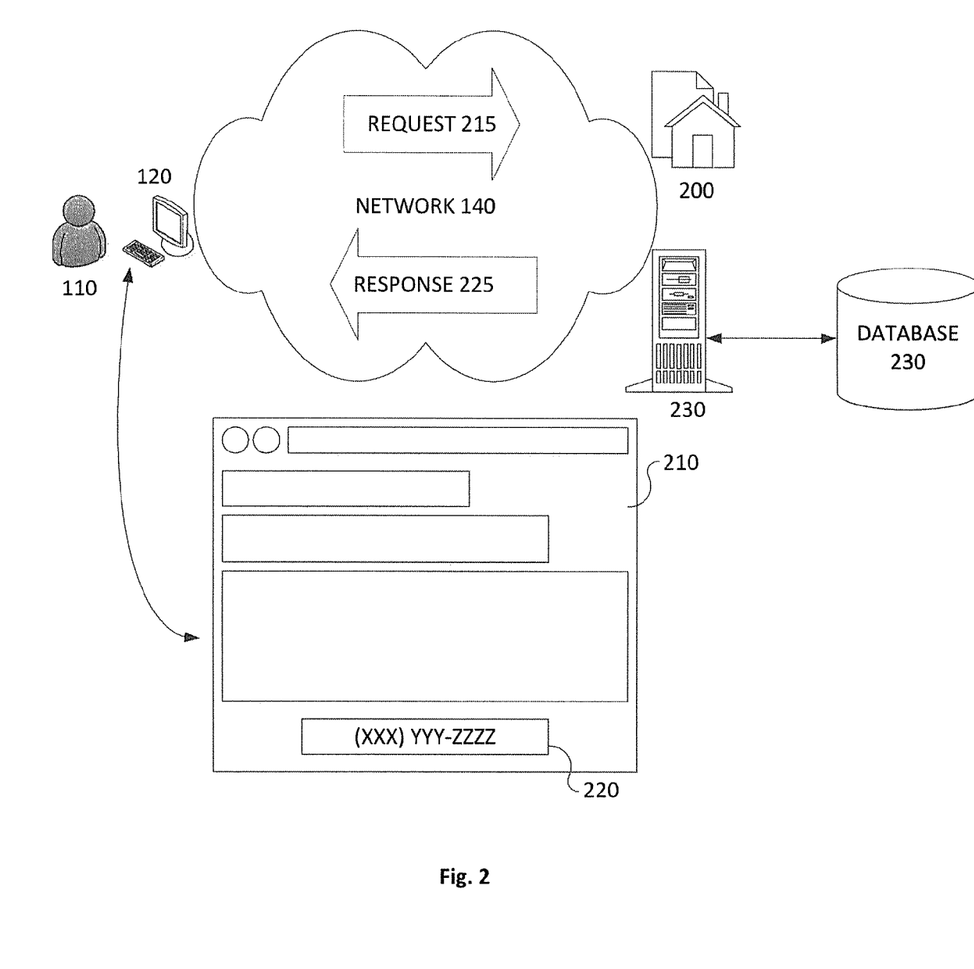
FIG. 2 illustrates simplified block diagram illustrative of the interaction of a prospective customer with the cross-channel CRM support system and a client web site, wherein phone numbers are dynamically inserted into a web page(s) at the client web site and based on various web-based activity and collected referral and funnel data for the prospective customer.

Thus, as shown in FIG. 2, a user 110 may access one or more web pages 210 at a client's web site 200 via a computer 120 (e.g., conventional personal computers, workstations, tablet computers, as well as Web-enabled hand-held devices, smart phones, and Internet appliances, etc.) to obtain information about the products/services offered by the client. As the prospective customer 110 navigates the Internet, the prospective customer generates referral data that may be collected in various conventionally known ways described above. Likewise, as the prospective customer generates funnel data as the prospective customer 110 navigates the pages of the client web site 200. Based on that data, which is indicative of the prospective customer's web-based activity and particular interest, the user 110 is presented with a displayed contact phone number 220 on the client's web site that may be called to obtain additional information, schedule an appointment and/or speak with a representative of the client.

In accordance with the disclosed embodiments, that contact phone number 220 may be dynamically inserted into the web page 210 of the web site 200 using script running on the web page 210 that makes a request 215 to a server 230 of the cross-channel CRM support system 100. Assuming the request is properly formatted, a contact phone number (XXX) YYY-ZZZZ may be selected and retrieved from database 230 by the server 230, and included in the web page 210 served to the prospective customer's computer 120 in a response 225 over the network 140, and displayed on web page 210 in the designated position 220.

Accordingly, based on the contents of the request 215, the cross-channel CRM support system server 230 issues a response 225 that includes a contact phone number to be inserted at the client web page 210 to be viewed by a specific prospective customer 110.

Thus, the voice call number for display may be selected to be specific to a particular prospective customer visiting the client's web site. Alternatively, the contact phone number may be selected to be specific to a particular advertisement campaign or a particular advertisement for the client displayed to the prospective customer, e.g., a PPC advertisement. Regardless, referral and funnel data may be analyzed to determine which contact phone number should be inserted at the client's web site to enable the ability to access and analyze the referral and/or funnel data, intelligently route the incoming call and utilize that data to improve the caller's experience during the voice call. This data may be stored, analyzed, and/or some portion or all of it may be provided to personnel answering the call to the displayed phone number. Such functionality is particularly useful to pre-inform that personnel about the call and the caller and enable the personnel to follow a pre-defined script for handling the call. Additionally, that data may be utilized to intelligently route the call to specific personnel that may have training or skills that enable them to handle the call effectively.

Thus, for example, this data may be forwarded to, for example, a call center and/or Interactive Voice Response (IVR) system or applications used by such a system that enable intelligent marketing, sales, and follow up for prospective customers of a client. For example, data indicating the prospective customer's web-based activity for a call could be forwarded to an IVR system for call processing by an automated call attendant, wherein the data is used to intelligently query the prospective customer based on the prospective customer's web-based activity. Alternatively, with information about the prospective customer's web-based activity that led to the prospective customer's call, that call can be intelligently routed in an automated manner to specialized applications running on the client's IVR system and/or subsequently routed in an informed intelligent manner to specialized call handling agents in a call center. Because the inventive CRM system has access to data indicating how the prospective customer obtained the contact phone number for the client, inbound IVRs can intelligently route callers using additional information than the conventionally available information such as the caller's geography, product interest, or time of call. As a result, the client and their sales agents are more prepared for an incoming call than they would have been conventionally.

For example, the phone number may be linked to an inbound IVR phone menu(s) that is particular to a specific client advertisement campaign, a particular advertisement, a particular product/service or type of product/service offered by the system's client. Moreover, mapping to a particular contact phone number can enable customization of an inbound IVR to upsell or cross-sell the client's products based on what the prospective customer was doing on the Internet, e.g., based on key words, the landing page on the client's web site that included the contact phone number, etc.

By integrating the client's IVR (or a hosted IVR operated for the client) with CRM data gathered during the prospective customer's web-based activity, the client (or a CRM organization acting on behalf of the client) can customize each caller's on-hold experience by playing promotional messages specific to their needs, buying history and the caller's web-based activity.

Additionally, or alternatively, the phone number may be linked to various analytics and sales applications that may be used while or after the voice call is completed, e.g., quality surveys, methodologies for qualifying prospective customers (e.g., based on referral data, client web site funnel data and/or income or credit data that may be available to the client via, for example, third party sources or from the client's own collected data).

This dynamic contact phone number insertion enables online and mobile marketers to display unique contact phone numbers on a client web site based on referring keyword(s), PPC advertisements, referring search engine, or online or mobile banner advertisements and to track which web-based activity generate phone calls and sales leads. This enables the tracking of online marketing ROI by displaying a unique phone number based on identification of keyword(s), referring domains, or advertisement campaigns on a client's website. As a result, call tracking reports may be generated and analyzed to determine which web-based and real world marketing efforts generate the most voice calls to the client, as well as the best conversion rates to actual revenue.

In this way, various conventionally available analytics programs may be used to generate reports that span across multiple channels of communication, e.g., web-based and voice calls.

Disclosed embodiments may be implemented in different ways to provide optimal effect for specific clients. For example, the disclosed embodiments may be ideal for small PPC campaigns or for high-level SEO conversion tracking to assign unique contact phone numbers to specific web-based activity. Based on the referral source of a visitor to the client's website, the cross-channel CRM support system can initiate dynamic insertion of a contact phone number associated with the web-based activity. The client (or a CRM organization acting on behalf of the client) may then generate view and analyze reports to analyze conversion rates for different keywords, search engines, or online and mobile advertisements.

For larger online and mobile marketing campaigns, a client may request assignment of a pool or group of phone numbers to specific web-based activity (e.g., keywords within a PPC advertisement group). For example, in accordance with at least one disclosed embodiment, the data indicating keywords, the referral and/or web site data may be input into specialized analytics software, e.g., SalesForce™. Additionally, in accordance with at least one disclosed embodiment, the tracked data may be aggregated with data provided by the client web site or a third party's analytics software (e.g., Google Analytics, Google Universal Analytics) so that the client can not only make informed call routing decisions for IVRs and call centers, but also determine the value of certain bid upon key words over a period of time as well as the lifetime value of keywords based on account revenue. This data aggregation may be based at least in part on the ability to map voice calls into a format that may be aggregated with data conventionally obtained by such analytics software.

Figure 3:
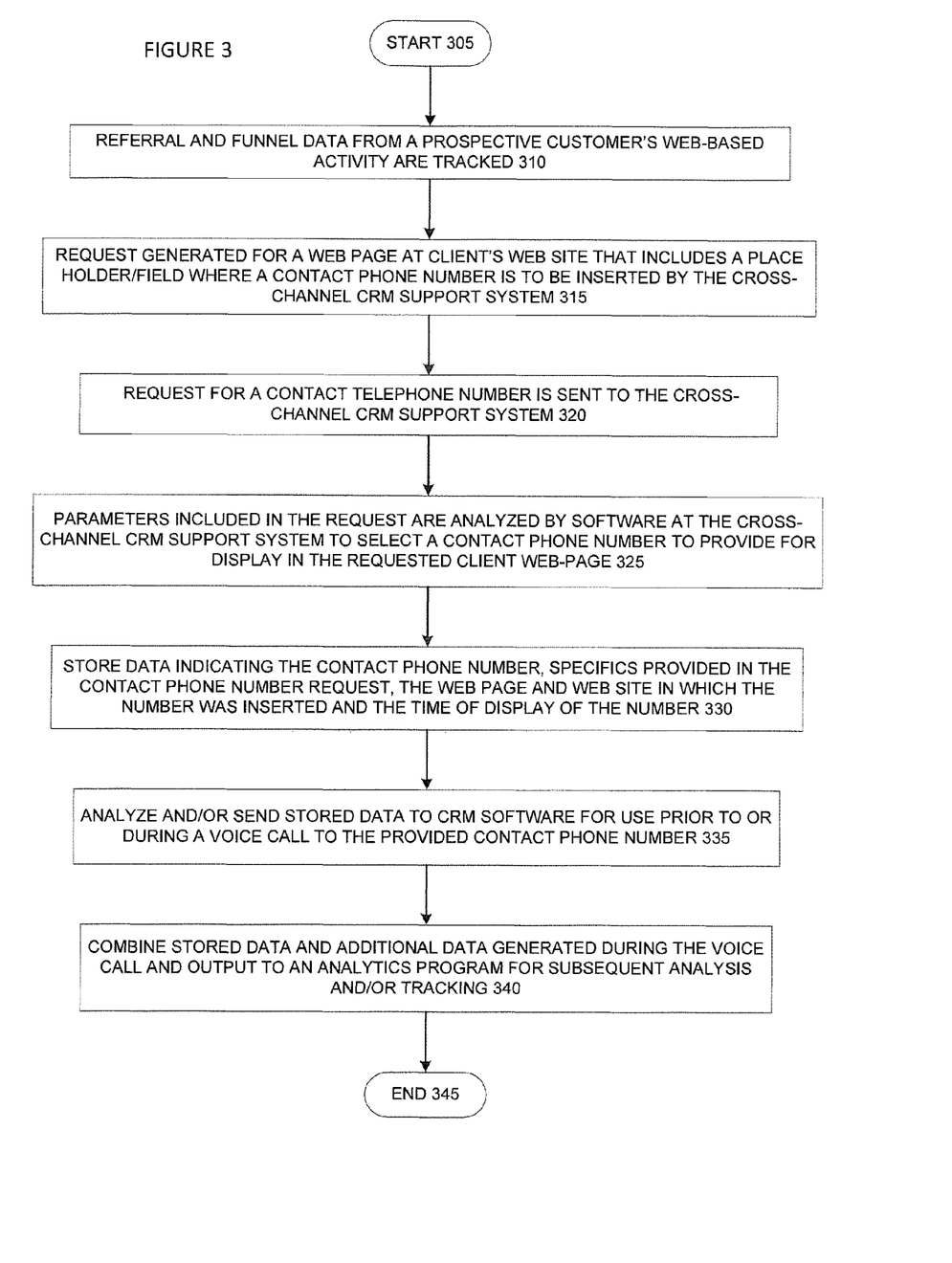
FIG. 3 illustrates an example of a methodology performed in accordance with a disclosed embodiment select and display a contact phone numbers based on parameters such as a search term or the referring domain used to navigate to a client's web page.

FIG. 3 illustrates an example of a methodology performed in accordance with a disclosed embodiment select and display a contact phone numbers based on parameters such as a search term or the referring domain used to navigate to a client's web page As shown in FIG. 3, the method begins at 305 and control proceeds to 310 at which referral and funnel data from a prospective customer's web-based activity are tracked. As explained above, this may include keywords used at a search engine used by the prospective customer, the identity of the search engine, an indication of a PPC advertisement clicked on that leads to the client's web site, a referral page, a tagged URL, and funnel data from the client's web site. Control then proceeds to 315, at which a request is generated for a web page at the client's web site that includes a place holder/field where a contact phone number is to be inserted by the cross-channel CRM support system.

Control then proceeds to 320, at which a request for a contact telephone number is sent to the cross-channel CRM support system. Control then proceeds to 325, at which the parameters included in the request are analyzed by software at the cross-channel CRM support system to select a contact phone number to provide for display in the requested client web-page. Control then proceeds to 330, at which data is stored indicating the contact phone number, the specifics provided in the contact phone number request (e.g., referral and/or funnel data), the web page and web site in which the number was inserted and the time of display of the number. Control then proceeds to 335, at which the stored data is analyzed and/or sent to CRM software, e.g., IVR support software, call center call routing software for use prior to or during a voice call to the provided contact phone number. Control then proceeds to 340, at which the stored data and additional data generated during the voice call to the contact telephone number is combined and output to an analytics program for subsequent analysis and/or tracking. Control then proceeds to 345, at which the method ends.

Additional details regarding the analysis performed by the cross-channel CRM support system is now provided. It should be understood conceptually that, within the cross-channel CRM support system, each client web site is mapped to a specific set of rules that match referral and funnel data generated by a prospective customer's web-based activity to a contact phone number or group of contact phone numbers.

As explained above, the contact phone number is selected from a specific pool of numbers assigned to specific web-based activity performed by the prospective customer. For example, this activity may include searching the Internet using one or more specific keywords. Alternatively, this activity may include visiting a client's web page through referral from another domain, via a tagged Uniform Resource Locator (URL) of a referring web page, via selection of a Pay Per Click (PPC) advertisement on another web page, e.g., a social media site, or displayed on a search engine. Still further the activity may include a direct visit to the client's web site with no or minimal referral data being generated.

Each of these web-based activities generates referral data. For example, domain referrals and tagged URLs may provide data indicating the domain of the referring web page; characteristics of that referring web page may be known by the cross-channel CRM support system or accessed and matched to specific rules that enable identification of a particular contact phone number for insertion at the client's web page. Likewise, the prospective customer's use of keywords in a search engine provides those keywords that may be matched to specific rules within the cross-channel CRM support system to identify a particular contact phone number for insertion at the client's web page. Further, when a PPC advertisement (e.g., an advertisement relating to septic tank repair) is clicked on by a potential customer, referral and funnel data may be generated that enables targeted identification of a particular contact phone number for insertion at the client's web page that pertains to the client's septic tank repair and maintenance services.

Using this referral data, and optionally, funnel data generated by the prospective customer's activity at the client's web site, the cross-channel CRM support system selects a contact phone number for insertion at the client's web site for display to the prospective customer. In this way, different web-based activities may be mapped to different contact phone numbers for insertion at a client's web site.

As explained above in connection with FIG. 2, a contact phone number may be dynamically inserted into the web page of the client web site using script running on the client web page that makes a request 215 to server 230 of the cross-channel CRM support system in one of a number of ways.

For example, the cross-channel CRM support system may be implemented using an Application Programming Interface (API), which may be utilized to respond to requests for contact phone numbers to be inserted at a client's web page(s) by providing dynamic tracking numbers via a REST-like endpoint. Such contact phone numbers may be provided at client web page(s) by using an API in a client's server-side logic, which makes a request to the system and receives a number, and inserts that number into the content that is served in the page request; as a result, a dynamic number is requested and inserted on the server-side, before being sent to a visitors computer. Alternatively, the contact phone numbers may be provided at client web page(s) using an API by JavaScript®, which makes request to the API, after the client's webpage has loaded in the potential customer's browser. In such a situation, a request is made by JavaScript® after the page has loaded, and then the number is inserted on the page after a response is received by JavaScript®. Accordingly, a dynamic phone number is requested and inserted on the client side, after the page has been sent to the prospective customer's computer.

Based on the contents of that request 215, the cross-channel CRM support system issues a response 225 that includes a contact phone number to be inserted at the client web page. The cross-channel CRM support system server(s) 230 may accept and process requests made, for example, via an HTTP method POST. The following parameters may be used when making such a request: action=sourcetrak.get_number, ibp_api_version=2, api_key=YOURIBPAPIKEY, set_id=SOURCETRAKSETID In such a request, the action parameter may specify the endpoint to interact with, e.g., https://secure.ifbyphone.com/ibp_api.php. The api_key may be a secret key, which may be used to authorize the API request. The ibp_api_version parameter may specify the API version to access at the cross-channel CRM support system server(s). Lastly, the set_id parameter may specify the specific cross-channel CRM support system set to request contact phone numbers from.

Thus, the request sent to the cross-channel CRM support system server(s) with these required parameters maybe implemented as follows:
action=sourcetrak.get_number
ibp_api_version=2
api_key=582412ef391b9b21a91ef96e861834cdfaace35f
set_id=732
Such a request may result in an XML response as follows.

```
<?xml version="1.0" encoding="UTF-8"?>
<!DOCTYPE response [
<!ELEMENT result (#PCDATA)>
<!ELEMENT result_description (#PCDATA)>
<!ELEMENT data (sourceTrak+)>
<!ELEMENT sourceTrak (log_id, number, type)>
<response>
    <result>success</result>
    <result_description>SourceTrak Phone Number</result_description>
    <data>
        <sourceTrak>
            <log_id>22265</log_id>
            <number>8155720747</number>
            <type>main</type>
        </sourceTrak>
    </data>
</response>
```

In the above implementation, the number element is the contact phone number that is provided for insertion in the client's web page(s) in response to an initial request to the cross-channel CRM support system server(s).

The type element specifies the number type of the phone number returned to the client's web site for insertion and display to a prospective customer. The types of phone numbers may include: main, onetoone:ad, onetoone:domain, onetoone:keyword, ppc, ppc:sourceguard, seo, and seo:sourceguard.

The "main" type of phone number comprises a single phone number that is attributable to a single client. A "onetoone:ad" type of phone number is a single phone number that is attributable to a single advertisement for the client. A "onetoone:domain" type of phone number is a single phone number that is attributable to a single referral domain. A "onetoone:keyword" type of phone number is a single phone number that is attributable to a single keyword of interest to and identified by the client. A "ppc" type of phone number includes a pool of phone numbers attributable to a PPC campaign for the client. An "seo" type of phone number is a pool of phone numbers attributable to a search engine optimization scheme.

With "ppc:sourceguard" and "seo:sourceguard" types of contact phone numbers, the accuracy of call tracking data during abnormal spikes in web-traffic (e.g., when a client's web site becomes inundated with visitors and hits) may be preserved by displaying an "overflow" number to prospective customers. In such a situation, the specified search terms retain their unique phone numbers, giving the cross-channel CRM support system better accuracy in pinpointing the source of a call.

To be more specific, when the cross-channel CRM support system "matches" an actual voice call to a phone number selected and displayed to a prospective customer visiting a client's web site, the system matches the dialed phone number to the identity of the prospective customer that viewed that phone number using the last time that particular phone number was displayed. Based on several metrics, the cross-channel CRM support system assigns the "match" a confidence score, which indicates how likely the match is accurate. This confidence score is useful because the cross-channel CRM support system will always respond to a request with a phone number; however, the phone number may have been displayed to multiple prospective customers at the client's web site.

For example, if a pool of five numbers has been associated with a particular client web site, then, by default, the first five prospective customers visiting the client's web site each are provided with unique phone numbers to contact the client. However, the sixth prospective customer to visit the client's web site may be provided with the same contact phone number as the first prospective customer. When that happens, the degree of confidence that the correct web-based activity is matched up the phone call is reduced.

For example, Sam visits plumbersrus.com at 12:00 pm, and then calls the displayed contact phone number at 12:10 pm. The contact phone number he was shown on the web site was displayed only once in hour preceding his call; thus, the confidence score would indicate a high level of confidence that it was Sam's visit to client's web site that generated the phone call to the displayed contact number.

However, if the web site becomes quite busy and Paul visits the same site at 12:05, and is shown the same contact phone number as Sam, then two distinct visitors have been shown the contact phone number within the hour. This means that, when a call comes in to the displayed contact phone number, it is unsure which prospective customer (Paul or Sam) is calling.

Accordingly, disclosed embodiments may be implemented in a manner that ensures that every contact phone number in a pool of numbers is assigned to a particular, prospective customer for 60 minutes (by default) to a single visitor. Thus, in the above example, if a pool has five numbers, but the client web-site (or web-page, key words, search engine referral, etc. associated with the pool) received more than five prospective customers visiting the site in an hour, all subsequent prospective customers may see a different, "overflow" contact phone number that is the same for all subsequent prospective customers above five until the increased web traffic decreases. Thus, in the above example, Paul would have seen the overflow number; thus, when Sam called the contact phone number displayed to him at the web site, there is a high degree of confidence that the match between the web-based activity and voice call is accurate.

As explained above, a contact phone number is provided to a prospective customer visiting a client's web site in a response to a request. The following are exemplary of valid request parameters: log_id, referrer, baseURI, formatting, _ibp_custom, _ibp_keyword, _ibp_match_type, and _ibp_unique_id. Of course, other valid request parameters may be warranted without departing from the spirit and scope of embodiments of the present invention. If no other match type parameters are set (or matched) but the _ibp_unique_id parameter is set, a number may be automatically chosen from a Search Engine Optimization (SEO) contact phone number pool to return in a response.

As explained above, the disclosed embodiments utilize referral and/or funnel data to identify web-based activity that is mapped to rules for providing specific contact phone numbers for insertion on a client's web site pages. The process for setting up the mapping and rules will now be provided. The process begins by selecting the web-based activity of interest to the client, e.g., PPC advertisement clicks, use of specific keywords or keyword combinations, use of keywords with omission of other keywords, referral data that indicates specific referring sites, etc. Subsequently, the web-based activity is mapped to a match type, e.g., advertisement/advertisement group, domain, keyword, etc., and the match type is used by the cross-channel CRM support system to select a phone number to insert at the client's web site.

In at least one disclosed embodiment, the client may provide information to enable the mapping and/or formulation of rules via a Graphical User Interface (GUI) provided b the cross-channel CRM support system. For example, see FIG. 8 of U.S. Ser. No. 13/601,447, filed Aug. 31, 2012 (which is assigned to the assignee of the present application, and is incorporated herein by reference in its entirety), the user may select the "Add new Match Term" button to associate a specific phone number with specific web-based activity. In this way, different numbers may be assigned to specific activities that can be added via a "Add new Match Term" button.

These activities can be configured as one of three types, as determined by a "Match Type" drop-down menu (not shown), which may provide the following options: advertisement/advertisement campaign match type (which may apply to DNI for any link as well as, for example, Google® AdWords® advertisements and pay-per-click advertisements); domain match type (which may, for example, associate a phone number with a referring domain, for example, www.twitter.com); and keyword match type (which may, for example, select a specific phone number based on the presence and/or absence of specific search engine keywords used by a prospective customer). Each one of these match types can be configured across three different matching groups: One To One; PPC; and SEO.

A request with parameters which match to a basic match type will differ depending on the match type. For example, for the Ad/AdGroup match type, the POST request may be implemented as follows:
   action=sourcetrak.get_number
   ibp_api_version=2
   api_key=582412ef391b9b21a91ef96e861834cdfaace35f
   set_id=732
   baseURI=http://example.com?ipb-
      adgroup=exampleAdTag
The response for the Ad/AdGroup match type may be implemented as follows:

```
<?xml version="1.0" encoding="UTF-8"?>
<!DOCTYPE response [
<!ELEMENT result (#PCDATA)>
<!ELEMENT result_description (#PCDATA)>
<!ELEMENT data (sourceTrak+)>
<!ELEMENT sourceTrak (log_id, number, type)>
]>
<response>
    <result>success</result>
    <result_description>SourceTrak Phone Number</result_description>
    <data>
        <sourceTrak>
            <log_id>22265</log_id>
            <number>5555720747</number>
            <type>onetoone:ad</type>
        </sourceTrak>
    </data>
</response>
```

Likewise, for the Domain match type, the POST request may be implemented as follows:
   action=sourcetrak.get_number
   ibp_api_version=2
   api_key=582412ef391b9b21a91ef96e861834cdfaace35f
   set_id=732
   referrer=http://example.com/
The response for the Domain match type may be implemented as follows:

```
<?xml version="1.0" encoding="UTF-8"?>
<!DOCTYPE response [
<!ELEMENT result (#PCDATA)>
<!ELEMENT result_description (#PCDATA)>
<!ELEMENT data (sourceTrak+)>
<!ELEMENT sourceTrak (log_id, number, type)>
]>
<response>
    <result>success</result>
    <result_description>SourceTrak Phone Number</result_description>
    <data>
        <sourceTrak>
            <log_id>22266</log_id>
            <number>5555720748</number>
            <type>onetoone:domain</type>
        </sourceTrak>
    </data>
</response>
```

Likewise, for the Keyword match type, the POST request may be implemented as follows:
   action=sourcetrak.get_number
   ibp_api_version=2
   api_key=582412ef391b9b21a91ef6e861834cdfaace35f
   set_id=732
   referrer=http://www.google.com/url?q=example+query
The response for the Keyword match type may be implemented as follows:

```
<?xml version="1.0" encoding="UTF-8"?>
<!DOCTYPE response [
<!ELEMENT result (#PCDATA)>
<!ELEMENT result_description (#PCDATA)>
<!ELEMENT data (sourceTrak+)>
<!ELEMENT sourceTrak (log_id, number, type)>
]>
<response>
    <result>success</result>
    <result_description>SourceTrak Phone Number</result_description>
    <data>
        <sourceTrak>
            <log_id>22267</log_id>
            <number>5555720749</number>
```

```
        <type>onetoone:keyword</type>
      </sourceTrak>
    </data>
</response>
```

There may be a situation when the referral or funnel data collected during the prospective customer's web-based activity does not provide adequate parameters to include in the POST request to match the request to a given group or match type. Likewise, there may be a situation in which the referral or funnel data indicates parameters that do not have a match type or group for the client, e.g., the prospective customer has been searching for fast food restaurants and the client is a plumber. In such situations, a default main number for the client may be provided for insertion in the requested web page to ensure that an appropriate contact phone number is provided. In such situations, the POST request may be implemented as follows:

action=sourcetrak.get_number
    ibp_api_version=2
    api_key=582412ef391b9b21a91ef96e861834cdfaace35f
    set_id=732

The response to that POST request may be implemented as follows:

```
<?xml version="1.0" encoding="UTF-8"?>
<!DOCTYPE response [
<!ELEMENT result (#PCDATA)>
<!ELEMENT result_description (#PCDATA)>
<!ELEMENT data (sourceTrak+)>
<!ELEMENT sourceTrak (log_id, number, type)>
]>
<response>
    <result>success</result>
    <result_description>SourceTrak Phone Number</result_description>
    <data>
        <sourceTrak>
            <log_id>22268</log_id>
            <number>5555720741</number>
            <type>main</type>
        </sourceTrak>
    </data>
</response>
```

With the above provided description of the number and type elements in mind, it should be understood that the log_id element is an identification of the prospective customer that may be used by the cross-channel CRM support system and the client's web site to ensure that (if preferred by the client) a consistent contact phone number is inserted at the client's web page throughout the prospective customer's web-based activity at the client web site, e.g., while in the funnel.

More specifically, it should be understood that every request for a new number to insert at a client web site will return a log_id. This value is unique to the source request, e.g., the combination of an identification of the prospective customer and the web page the prospective customer is visiting. As a result, the log_id can be used to maintain insertion of a contact phone number throughout the prospective customer's visit to the client web site, which may be thought of as a session. Accordingly, this log_id parameter can be included in requests subsequent to a prospective customer's web activity triggering a first request; as a result, the log_id parameter can be referred to at the cross-channel CRM support system server(s) in order to reliably insert the same number during the prospective customer's session.

As explained above, it should be understood that a number or pool of numbers may be available for insertion at a client's web site only for a period of time. This ensures efficient use of available numbers in the pool by the cross-channel CRM support system. This also ensures that the referral and funnel data used to set the parameters for matching a request to a given group or match type are still valid.

Thus, if the contact phone number associated with a log_id ages out, i.e., the period of time has expired for that contact phone number being available for insertion at the web page, a new contact phone number may be supplied, along with a new log_id. However, it should be understood that the new voice call new number may be determined from the parameters present in the most recent request made for the expired contact phone number.

This concept may be better understood by way of illustration; therefore, various implementation examples of the contact phone number requests and associated CRM support system responses will now be provided in which the call number is retained for insertion at the client web site during the prospective customer's session. In a first example, the request sent to the cross-channel CRM support system server(s) may be implemented as follows:

```
action=sourcetrak.get_number
ibp_api_version=2
api_key=582412ef391b9b21a91ef96e861834cdfaace35f
set_id=732
_ibp_unique_id=12345
    Response A:
        <?xml version="1.0" encoding="UTF-8"?>
        <!DOCTYPE response [
        <!ELEMENT result (#PCDATA)>
        <!ELEMENT result_description (#PCDATA)>
        <!ELEMENT data (sourceTrak+)>
        <!ELEMENT sourceTrak (log_id, number, type)>
```

The response to this request from the cross-channel CRM support system server(s) may be implemented as follows:

```
<response>
    <result>success</result>
    <result_description>SourceTrak Phone Number</result_description>
    <data>
        <sourceTrak>
            <log_id>27265</log_id>
            <number>5555720782</number>
            <type>seo</type>
        </sourceTrak>
    </data>
</response>
```

In a second example, request sent to the cross-channel CRM support system server(s) may be implemented as follows:

action=sourcetrak.get_number
    ibp_api_version=2
    api_key=582412ef391b9b21a91ef96e861834cdfaace35f
    set_id=732
    log_id=27265

The response from the cross-channel CRM support system server(s) to that request may be implemented as follows:

```
<?xml version="1.0" encoding="UTF-8"?>
<!DOCTYPE response [
<!ELEMENT result (#PCDATA)>
```

-continued

```
<!ELEMENT result_description (#PCDATA)>
<!ELEMENT data (sourceTrak+)>
<!ELEMENT sourceTrak (log_id, number, type)>
]>
<response>
    <result>success</result>
    <result_description>SourceTrak Phone Number</result_description>
    <data>
        <sourceTrak>
            <log_id>27265</log_id>
            <number>5555720782</number>
            <type>seo</type>
        </sourceTrak>
    </data>
</response>
```

Note, in both examples of the Request to the cross-channel CRM support system server(s) and the associated response the same contact phone number was returned because that was the contact phone number associated with the log_id. However, if the contact phone number associated with the session ages out, a new number and a new log_id will be returned. That new log_id could then be submitted in subsequent requests to the cross-channel CRM support system server(s) for a number for insertion for the client web page. However, that new contact phone number would be selected based on the parameters from the most recent request made for the number which expired.

Thus, the API gives control of identifying sources to the client; this is different than a JavaScript® implementation which is always in control of the source data. Using the API to give control to the client allows the client to have more control over attributing source data to phone numbers. The client can keep track of the original parameters it sends to the API and reuse some of them, if it would like to ensure that any new numbers returned after a number session ages out matches the proper source that the matched the first number to the visitor. The API enables the ability to choose/manipulate the source of a visitor, and to receive a number attributed to that source, unlike the client side JavaScript® method, which controls the source information, wherein the client does not have control over source attribution in that case.

It should be understood that the time period during which a contact phone number is inserted at a client's web site may be variable and customizable depending on the preference of the client.

Exemplary embodiments have been discussed in detail herein. While specific exemplary embodiments have been discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatus/systems for performing the operations disclosed herein. An apparatus/system may be specially constructed for the desired purposes, or it may comprise a general purpose apparatus/system selectively activated or reconfigured by a program stored in the apparatus/system.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM), random access memory (RAM), magnetic disk storage media, optical storage media, flash memory devices including thumb drives and solid state drives, and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Further, the term computer readable medium is meant to refer to any machine-readable medium (automated data medium) capable of storing data in a format readable by a mechanical device. Examples of computer-readable media include magnetic media such as magnetic disks, cards, tapes, and drums, punched cards and paper tapes, optical disks, barcodes and magnetic ink characters. Further, computer readable and/or writable media may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc).

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A cross-channel customer relationship management (CRM) support system that serves contact phone numbers for display at a client web site and uses the numbers to match web-based activity of a prospective customer with a call to one of the served contact phone numbers, the system comprising:
at least one database including the contact phone numbers organized into a plurality of predetermined pools of available contact phone numbers for insertion on a page of the client web site; and
at least one server coupled to the at least one database, the server running software that selects one of the contact phone numbers from one pool of available contact phone numbers for insertion on the page of the client web site based on data indicating the prospective customer's web-based activity that is sent to the at least one server as a result of the prospective customer's computer requesting the page of the client web site while visiting the client web site,
wherein the prospective customer's web-based activity is matched up with the call to the one of the served contact phone numbers to associate the web-based activity and voice call activity of the prospective customer with each other,
wherein the contact phone number selected is one of: specific to a prospective customer visiting the client web site, specific to a client advertisement campaign, or specific to a client advertisement.

2. The cross-channel CRM support system of claim 1, wherein the data indicating the matched prospective customer's web-based activity for the call to the one of the served contact phone numbers is forwarded to a CRM support system prior to the call being connected to call personnel thereby enabling the call personnel to have access to the data to assist in servicing the call.

3. The cross-channel CRM support system of claim 1, wherein the data indicating the matched prospective customer's web-based activity for the call to the one of the served contact phone numbers is forwarded to an interactive voice response (IVR) system for call processing by an automated call attendant, wherein the data is used to intelligently query the prospective customer based on the prospective customer's web-based activity.

4. The cross-channel CRM support system of claim 1, wherein the data indicating the matched prospective customer's web-based activity for the call to the one of the served contact phone numbers is matched up with data generated during the call and forwarded to a CRM system for subsequent analysis and/or processing.

5. The cross-channel CRM support system of claim 1, wherein the data indicating the matched prospective customer's web-based activity includes funnel data.

6. The cross-channel CRM support system of claim 1, wherein the data indicating the matched prospective customer's web-based activity includes domain referral data.

7. The cross-channel CRM support system of claim 1, wherein the data indicating the matched prospective customer's web-based activity includes keywords used by the prospective customer at a search engine.

8. The cross-channel CRM support system of claim 1, wherein the data indicating the matched prospective customer's web-based activity includes tagged uniform resource locator (URL) data.

9. The cross-channel CRM support system of claim 1, wherein the data indicating the matched prospective customer's web-based activity indicates whether the prospective customer's visit to the client web site is a direct visit.

10. The cross-channel CRM support system of claim 1, wherein the data indicating the matched prospective customer's web-based activity includes identification of a pay per click (PPC) advertisement selected by the prospective customer triggering the visit to the client web site.

11. The cross-channel CRM support system of claim 1, wherein each number in the pool of available numbers is served for insertion into a page of the client web site within a specified period of time.

12. The cross-channel CRM support system of claim 11, wherein in response to a number of visitors visiting the client web site within the specified period of time exceeds the number of contact phone numbers in the pool, the at least one server selects an overflow contact number for insertion on the page of the client web site viewed by each visitor beyond the number of visitors matching the number of contact phone numbers in the pool until the number of visitors visiting the client web site within the specified period of time no longer exceeds the number of contact phone numbers in the pool.

13. A method for serving contact phone numbers for display at a client web site, the method comprising:
organizing the contact phone numbers in at least one database into of available contact phone numbers for insertion on a page of the client web site; and
selecting, at least one server coupled to the at least one database, one of the contact phone numbers from one pool of available contact phone numbers for insertion on the page of the client web site based on data indicating the prospective customer's web-based activity that is sent to the at least one server as a result of the prospective customer's computer requesting the page of the client web site while visiting the client web site, and
using the phone numbers to match web-based activity of a prospective customer with a call to one of the served contact phone numbers so as to associate the prospective customer's web-based activity and voice call activity of the prospective customer with each other,
wherein in response to a number of visitors visiting the client web site within the specified period of time exceeds the number of contact phone numbers in the pool, the at least one server selects an overflow contact number for insertion on the page of the client web site viewed by each visitor beyond the number of visitors matching the number of contact phone numbers in the pool until the number of visitors visiting the client web site within the specified period of time no longer exceeds the number of contact phone numbers in the pool,
wherein the contact phone number selected is one of: specific to a prospective customer visiting the client web site, specific to a client advertisement campaign, or specific to a client advertisement.

14. The method of claim 13, further comprising forwarding the data indicating the matched prospective customer's web-based activity for the call to the one of the served contact phone numbers to a customer relationship management (CRM) support system prior to the call being connected to call personnel thereby enabling the call personnel to have access to the data to assist in servicing the call.

15. The method of claim 13, further comprising forwarding the data indicating the matched prospective customer's web-based activity for the call to the one of the served contact phone numbers to an interactive voice response (IVR) system for call processing by an automated call attendant, wherein the data is used to intelligently query the prospective customer based on the prospective customer's web-based activity.

16. The method of claim 13, further comprising matching up the data indicating the matched prospective customer's web-based activity for the call to the one of the served contact phone numbers with data generated during the call and forwarding the matched up data to a CRM system for subsequent analysis and/or processing.

17. The method of claim 13, wherein the data indicating the matched prospective customer's web-based activity includes funnel data.

18. The method of claim 13, wherein the data indicating the matched prospective customer's web-based activity includes domain referral data.

19. The method of claim 13, wherein the data indicating the matched prospective customer's web-based activity includes keywords used by the prospective customer at a search engine.

20. The method of claim 13, wherein the data indicating the matched prospective customer's web-based activity includes tagged uniform resource locator (URL) data.

21. The method of claim 13, wherein the data indicating the matched prospective customer's web-based activity indicates whether the prospective customer's visit to the client web site is a direct visit.

22. The method of claim 13, wherein the data indicating the matched prospective customer's web-based activity includes identification of a pay per click (PPC) advertisement selected by the prospective customer triggering the visit to the client web site.

23. The method of claim 13, wherein each number in the pool of available numbers is served for insertion into a page of the client web site within a specified period of time.

24. A computer readable medium having instructions for causing a computer to execute a method comprising
   organizing the contact phone numbers in at least one database into a plurality of predetermined pools of available contact phone numbers for insertion on a page of the client web site; and
   selecting, at least one server coupled to the at least one database, one of the contact phone numbers from one pool of available contact phone numbers for insertion on the page of the client web site based on data indicating the prospective customer's web-based activity that is sent to the at least one server as a result of the prospective customer's computer requesting the page of the client web site while visiting the client web site, and
   using the phone numbers to match web-based activity of a prospective customer with a call to one of the served contact phone numbers so as to associate the prospective customer's web-based activity and voice call activity of the prospective customer with each other,
   wherein the contact phone number selected is one of: specific to a prospective customer visiting the client web site, specific to a client advertisement campaign, or specific to a client advertisement.

25. The computer readable medium of claim 24, wherein the method further comprises forwarding the data indicating the matched prospective customer's web-based activity for the call to the one of the served contact phone numbers to a CRM support system prior to the call being connected to call personnel thereby enabling the call personnel to have access to the data to assist in servicing the call.

26. The computer readable medium of claim 24, wherein the method further comprises forwarding the data indicating the matched prospective customer's web-based activity for the call to the one of the served contact phone numbers to an IVR system for call processing by an automated call attendant, wherein the data is used to intelligently query the prospective customer based on the prospective customer's web-based activity.

27. The computer readable medium of claim 24, wherein the method further comprises matching up the data indicating the matched prospective customer's web-based activity for the call to the one of the served contact phone numbers with data generated during the call and forwarding the matched up data to a CRM system for subsequent analysis and/or processing.

28. The computer readable medium of claim 24, wherein the data indicating the matched prospective customer's web-based activity includes funnel data.

29. The computer readable medium of claim 24, wherein the data indicating the matched prospective customer's web-based activity includes domain referral data.

30. The computer readable medium of claim 24, wherein the data indicating the matched prospective customer's web-based activity includes keywords used by the prospective customer at a search engine.

31. The computer readable medium of claim 24, wherein the data indicating the matched prospective customer's web-based activity includes tagged uniform resource locator (URL) data.

32. The computer readable medium of claim 24, wherein the data indicating the matched prospective customer's web-based activity indicates whether the prospective customer's visit to the client web site is a direct visit.

33. The computer readable medium of claim 24, wherein the data indicating the matched prospective customer's web-based activity includes identification of a pay per click (PPC) advertisement selected by the prospective customer triggering the visit to the client web site.

34. The computer readable medium of claim 24, wherein each number in the pool of available numbers is served for insertion into a page of the client web site within a specified period of time.

35. The computer readable medium of claim 24, wherein response to a number of visitors visiting the client web site within the specified period of time exceeds the number of contact phone numbers in the pool, the at least one server selects an overflow contact number for insertion on the page of the client web site viewed by each visitor beyond the number of visitors matching the number of contact phone numbers in the pool until the number of visitors visiting the client web site within the specified period of time no longer exceeds the number of contact phone numbers in the pool.

* * * * *